US005500579A

United States Patent [19]
Kim et al.

[11] Patent Number: 5,500,579
[45] Date of Patent: Mar. 19, 1996

[54] ELECTRIC MOTOR CONTROL WITH INTEGRAL BATTERY CHARGER

[75] Inventors: Sang H. Kim, Hoffman Estates; Edward Li, Roselle; Ralph M. Mitchell, Elgin, all of Ill.

[73] Assignee: Motorola, Inc., Schaumburg, Ill.

[21] Appl. No.: 368,064

[22] Filed: Jan. 3, 1995

[51] Int. Cl.$^6$ ............................. H02K 23/52; H02J 7/14
[52] U.S. Cl. ..................... 318/493; 318/139; 307/10.1; 320/50; 320/64
[58] Field of Search ..................... 318/139, 140, 318/144, 149, 151, 152, 153, 154, 158, 440, 441, 442, 478, 479, 493, 494, 504, 521; 290/9, 10; 307/9.1, 10.1; 320/2, 5, 9, 12, 32, 39, 43, 49, 50, 61, 62, 63, 64, 65; 322/13, 14, 25, 28; 323/259, 260; 363/19, 21, 23, 25, 26, 102, 164, 174, 175

[56] References Cited

U.S. PATENT DOCUMENTS

| | | |
|---|---|---|
| 3,904,947 | 9/1975 | Crews . |
| 3,943,423 | 3/1976 | Hoffman . |
| 3,970,912 | 7/1976 | Hoffman . |
| 4,143,280 | 3/1979 | Kuehn, Jr. et al. . |
| 4,258,304 | 3/1981 | Bourke . |
| 4,308,492 | 12/1981 | Mori et al. . |
| 4,616,166 | 10/1986 | Cooper et al. . |
| 4,920,475 | 4/1990 | Rippel . |

FOREIGN PATENT DOCUMENTS

WO93/02887  2/1993  United Kingdom .

*Primary Examiner*—Bentsu Ro
*Attorney, Agent, or Firm*—Nicholas C. Hopman

[57] ABSTRACT

An electric motor control with integral battery charger includes battery terminals (201) for connection to a battery (203). A boost converter circuit (111) is coupled to an armature winding (209) of the electric motor (117), and has an input (131) coupled to a power source (211). A buck converter circuit (105) is coupled to a field winding (207) of the electric motor (117), and an input (133) coupled to the power source (211). A controller (205), is coupled to the battery terminals (201) and the power source (211). The controller (205) couples a boost output (107) of the boost converter circuit (111) to the battery terminals (201) while a terminal voltage of the power source (211) is lower than a terminal voltage of the battery (203) measured at the battery terminals (201), and couples a buck output (107) of the buck converter circuit (105) to the battery terminals (201) while the terminal voltage of the power source (211) is higher than the terminal voltage of the battery (203).

12 Claims, 2 Drawing Sheets

1

ELECTRIC MOTOR CONTROL WITH INTEGRAL BATTERY CHARGER

FIELD OF THE INVENTION

This invention is generally directed to the field of battery chargers, and specifically for battery chargers used to charge a battery used in an electric motor based application.

BACKGROUND OF THE INVENTION

In contemporary battery powered electric motor system applications, such as an electric vehicle, the vehicle's battery must be periodically recharged after being depleted during use. Often the vehicle's batteries are charged using a charger mounted on the vehicle. Typically, an AC current source—such as a source from a common wall outlet is transformed by the battery charger to replenish the depleted battery.

Because of various conditions characteristic of depleted batteries, the battery charger must be able to alternatively boost, or increase, a source voltage from the wall outlet as well as buck, or decrease, the source voltage from the wall outlet depending on a state of the battery. In one case, if the battery has been significantly depleted, then the source voltage must be decreased to be more proximate a terminal voltage of the depleted battery. If it isn't then it is difficult to effectively control the replenishment of the depleted battery. In another case, if the battery's terminal voltage is significantly higher than the source voltage, then the source voltage must be increased or boosted to be higher than the battery's terminal voltage so that current can flow from the battery charger to the battery.

If, as stated above, the battery charger is mounted on the vehicle a charger of this functional complexity can add not-insignificant weight to the vehicle. This is particularly concerning in the case of an electrical vehicle because efficiency is extremely important.

What is needed is an improved vehicular based motor control with integral battery charger that is lightweight and reliable.

DETAILED DESCRIPTION OF A PREFERRED EMBODIMENT

An electric motor control with integral battery charger includes battery terminals for connection to a be provided a battery. A boost converter circuit is coupled to an armature winding of the electric motor, and has an input coupled to a power source. A conversion, or buck converter circuit is coupled to a field winding of the electric motor, and an input coupled to the power source. The buck converter circuit can be used to either limit current or voltage. A controller is coupled to the battery terminals and the power source. The controller couples the boost output of the boost converter circuit to the battery terminals while a terminal voltage of the power source is lower than a terminal voltage of the battery measured at the battery terminals, and couples the buck output of the buck converter circuit to the battery terminals while the terminal voltage of the power source is higher than the terminal voltage of the battery. Essentially, in the preferred embodiment a circuit is described that reuses the motor armature and field windings, and control switches that are ordinarily uses to drive the motor to build a buck-boost converter for charging a battery.

Figure 1:
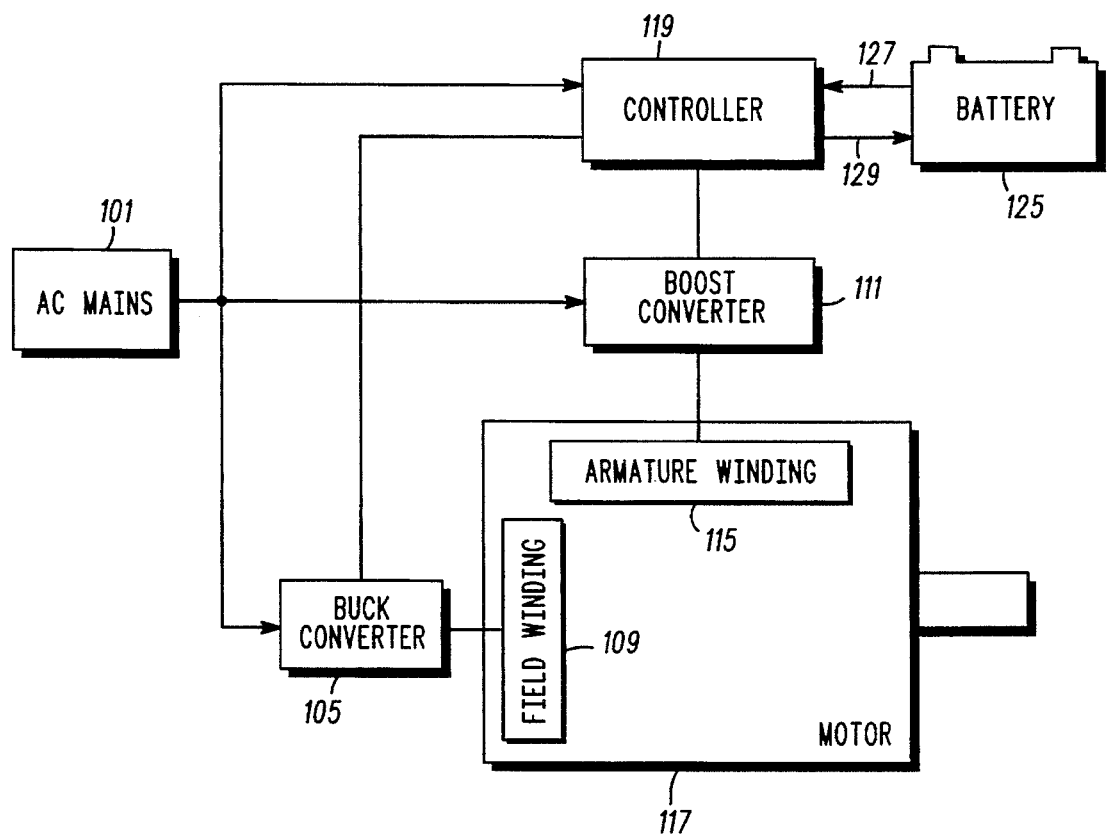
FIG. 1 is a system block diagram in accordance with a preferred embodiment of the invention.

In FIG. 1 a system block diagram illustrates a general configuration of a preferred embodiment of the invention. Preferably, this system is mounted on an electric vehicle to propel the vehicle. A voltage source, here AC mains 101 provide a charging voltage—resulting in an AC current to be used to charge a vehicle mounted battery 125. A controller 119 is coupled between the battery 125 and the AC mains 101. The controller may be constructed using discrete circuitry or may be based around a microcontroller. A signal 127 represents a measured terminal voltage of the battery 125 and 129 is a charge signal used to replenish the battery. A boost converter 111 is coupled between the controller 119 and an armature winding 115 of a motor 117. A buck converter is coupled between the controller 119 and a field winding 109 of a motor 117.

Figure 2:
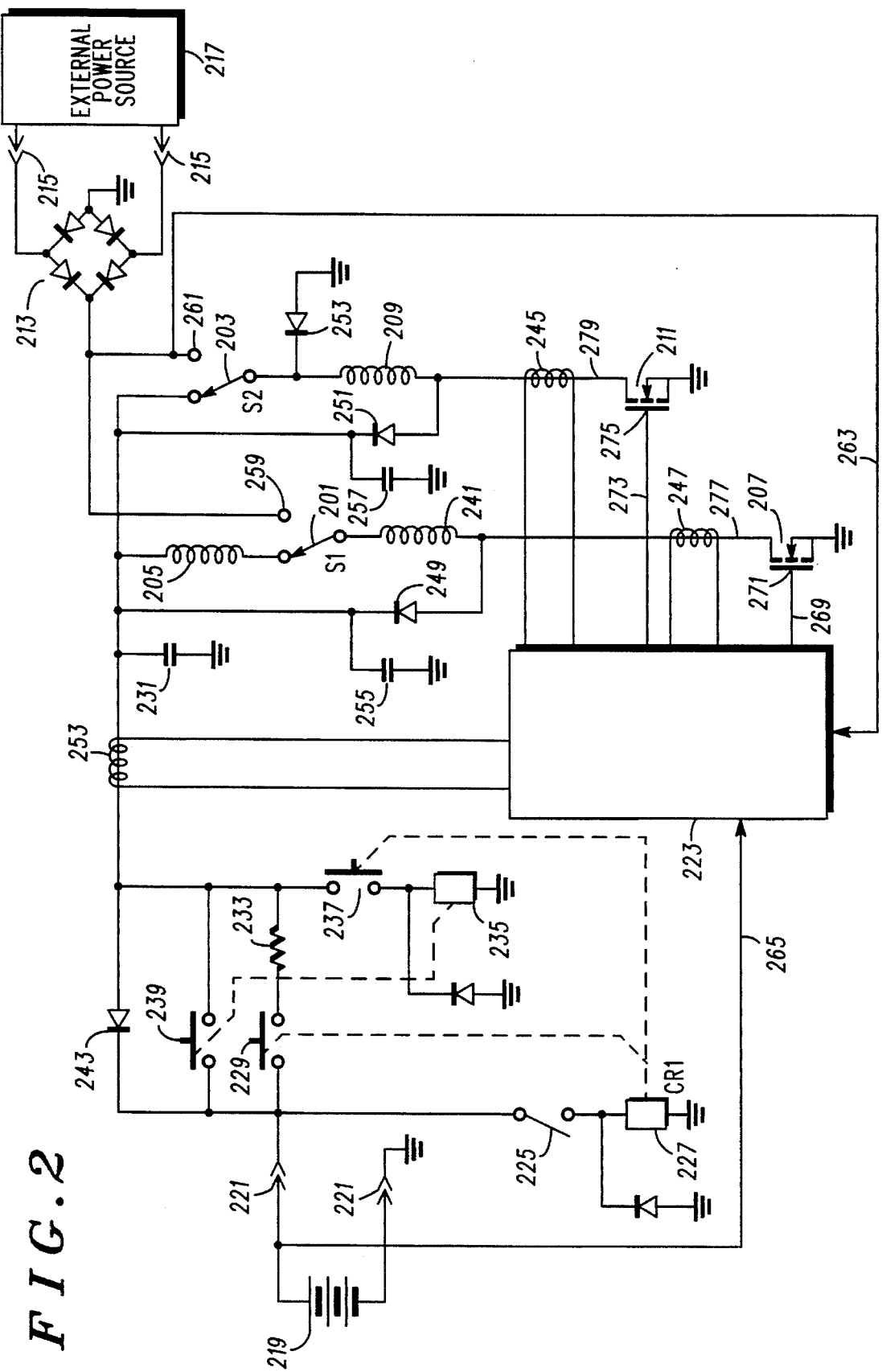
FIG. 2 is a schematic showing details of a circuit in accordance with a preferred embodiment of the invention.

FIG. 2 is a schematic showing details of a circuit 200 representing more detail of the system introduced in FIG. 1

First a motor drive or control mode will be described. In the motor control mode switches S1 201 and S2 203 are positioned in a motor drive position. When S1 201 is in the motor drive position, an armature winding 205 of the motor 117 is coupled to a first power switch output 277 of a first power switch—here a field effect transistor 207. When S2 203 is in the motor drive position, a field winding 209 of the motor 117 is coupled to a second power switch output 279 of a second power switch—here another field effect transistor 211. This disconnects a full-wave bridge circuit 213, including external power terminals 215 and an external power source 217 from the armature winding 205 and the field winding 209. Instead, the armature winding 205 and the field winding 209 are coupled to a battery 219 through battery terminals 221.

In the above-described configuration a controller 223, which is in-effect the same controller introduced as element 117 in FIG. 1, is used to drive the motor by depleting energy from the battery 219 through battery terminals 221, the armature winding 205 and the field winding 209, by controlling conduction of the field effect transistors 207 and 211. For example, a first signal 269 operatively coupled to the first power switch input 271, and a second drive signal 273 is operatively coupled to a second power switch input 275 of the second power switch 211. Next, an operating example will be described.

When an ignition keyswitch 225 is closed a relay CR1 225 is energized which in turn will close contact 229 and begin charging capacitor 231 through a resistor 233. When the capacitor 231 is sufficiently charged, contactor 235 will be energized through relay CR1 225 energized closed contact 237. This action will close contact 239. When contact 239 is closed the resistor 233 will be shorted out. This completes an initialization phase of the control mode.

By varying a pulse-width-modulated (PWM) duty cycle of the field effect transistors 207 and 211, the motor 117 is controlled, which in turn controls the torque and speed of the vehicle.

An inductor 241 is a component with a purpose of improving switching performance of the circuit 200 and also to provide the option for regeneration when the motor 117 is running below a base speed. Diode 243 is used to provide a return path for regeneration current to the battery 219 when the ignition keyswitch 225 is accidentally turned off while the motor 117 is still running. Motor current sensing is accomplished by using Hall-effect sensors 245 and 247.

When the motor windings are switched off, the components consisting of diodes 249, 251,253 and capacitors 255, 257 provide a current return path for the circuit 200.

Next a battery charging mode will be described. If the controller 223 senses via line 263 that the external power source 217 is powered-on, then the controller 223 will sample a terminal voltage of the battery via a line 265. If the battery's terminal voltage is lower than a predetermined value, then switch S2 203 will connected the full-wave bridge circuit 213, including external power terminals 215 and an external power source 217 to the field winding 209. This action will cause a trickle charge (low current charge) to be initiated through the field winding 209. Utilizing a relatively high resistance of the motor's field winding 209 as a current limiting device the battery 219 will be charged to a predetermined voltage prior to applying a fast charge. The trickle charge can also be accomplished by periodically cycling switch S2 203, in conjunction with the field winding 209 and components 251 and 231 in a buck converter configuration. In this mode of operation, both current and voltage can be controlled by varying the PWM duty cycle.

Having charged the battery 219 to a predetermined voltage, switch S2 203 must be switched back to the motor drive position and switch S1 201 switched to a charging mode position—thereby connecting switch contact 201 to terminals 259. The circuit 200 is now in condition to accept a fast charge. The fast charge is generated by pulsing a first power switch input of the first power switch or field effect transistor 207 the motor's armature winding 205 circuit. The armature winding 205, and optionally inductor 241 configured in series with the armature winding of the electric motor, in conjunction with components 231 and 251, form a boost converter to the rectified external power source 217 for fast charging the vehicle battery 219.

The battery terminal voltage must be higher than an output voltage of the full wave bridge to maintain control of the charging current. Should the output voltage of the full wave bridge exceed the battery terminal voltage, the charging current will be conducted through diode 249.

Since battery terminal voltage, battery current, via sensor 253, and armature current are monitored by the controller 223, the same components used for motor control mode can be used for the battery charging mode. State of battery charge, determination of required charging time and termination of charging are all determined by the controller 223. Charging current and voltage are controlled by varying the PWM duty cycle of signals 269 and 273.

In conclusion, an improved vehicular based motor control with integral battery charger that is inherently lightweight because no extra inductors and driving circuitry is required to separately charge the on-vehicle battery. Furthermore, this approach is both more manufacturable reliable than prior art approaches because of the dual-use of components which significantly reduces component count.

What is claimed is:

1. An electric motor control with integral battery charger for charging a battery from a power source using an armature winding and a field winding of an electric motor, the battery charger comprising:

battery terminals for connection to a to be provided battery;

a boost converter circuit coupled to the armature winding of the electric motor, the boost converter circuit having an input coupled to the power source and a boost output;

a conversion circuit coupled to the field winding of the electric motor, the conversion circuit having an input coupled to the power source and a buck output; and a controller coupled to the battery terminals and the power source, the controller for coupling the boost output of the boost converter circuit to the battery terminals while a terminal voltage of the power source is lower than a terminal voltage of the battery, and for coupling the buck output of the conversion circuit to the battery terminals while the terminal voltage of the power source is higher than the terminal voltage of the battery.

2. An electric motor control with integral battery charger in accordance with claim 1 wherein the conversion circuit comprises a current limiting circuit.

3. An electric motor control with integral battery charger in accordance with claim 1 wherein the conversion circuit comprises a voltage limiting circuit.

4. An electric motor control with integral battery charger in accordance with claim 3 wherein the voltage limiting circuit comprises a buck converter circuit.

5. An electric motor control with integral battery charger in accordance with claim 1 wherein the conversion circuit further comprises an inductor configured in series with the armature winding of the electric motor.

6. An electric motor control with integral battery charger system for charging a battery using an armature winding and a field winding of an electric motor, the battery charger comprising:

a voltage source for providing a charging voltage;

a battery for providing a battery terminal voltage;

a boost converter circuit coupled to the armature winding of the electric motor, the boost converter circuit having an input coupled to the voltage source;

a conversion circuit coupled to the field winding of the electric motor, the conversion circuit having an input coupled to the voltage source and a buck output; and a controller for measuring a voltage difference between the voltage source and the battery, and for coupling the battery to the output of the boost converter circuit while the voltage source has a magnitude lower than the terminal voltage of the battery and coupling the battery to the buck output of the conversion circuit while the voltage source has a magnitude higher than the terminal voltage of the battery.

7. An electric motor control with integral battery charger in accordance with claim 6 wherein the conversion circuit comprises a current limiting circuit.

8. An electric motor control with integral battery charger in accordance with claim 6 wherein the conversion circuit comprises a voltage limiting circuit.

9. An electric motor control with integral battery charger in accordance with claim 8 wherein the voltage limiting circuit comprises a buck converter circuit.

10. A system for charging a battery from a power source using an armature winding and a field winding of an electric motor, the system comprising:

battery terminals for connection to a to be provided battery;

a first power switch circuit coupled in series with the armature winding of the electric motor, the first power switch circuit having a first power switch input coupled to the power source and a first power switch output;

a second power switch circuit coupled to the field winding of the electric motor, the second power switch circuit having a second power switch input coupled to the power source and a second power switch output; and a controller coupled to the battery terminals and the power source, a) the controller in a drive mode for:

providing a first signal operatively coupled to the first power switch input for providing operative power from the battery to the armature winding of the electric motor; and providing a second signal operatively coupled to the second power switch input for providing operative power from the battery to the field winding of the electric motor;

b) the controller in a charging mode for:

providing a charge path from the power source to the battery terminals by coupling the first power switch output of the first power switch circuit to the battery terminals while a terminal voltage of the power source is lower than a terminal voltage of the battery, and for coupling the second power switch output of the second power switch circuit to the battery terminals while the terminal voltage of the power source is higher than the terminal voltage of the battery.

11. A system in accordance with claim 10 wherein the first power switch circuit comprises an armature winding current measurement circuit for measuring an armature winding current, wherein the provision of operative power from the battery to the armature winding of the electric motor in the drive mode is dependent on the armature signal provided by the armature winding current measurement circuit, and provision of energy in the charge path established in the charging mode is dependent on the armature signal provided by the armature winding current measurement circuit.

12. A system in accordance with claim 10 wherein the first power switch circuit comprises an field winding current measurement circuit for measuring an field winding current, wherein the provision of operative power from the battery to the field winding of the electric motor in the drive mode is dependent on the field signal provided by the field winding current measurement circuit, and provision of energy in the charge path established in the charging mode is dependent on the field signal provided by the field winding current measurement circuit.

* * * * *